March 24, 1931.  C. S. HALL  1,797,502
AIRCRAFT
Filed May 22, 1929  3 Sheets-Sheet 1
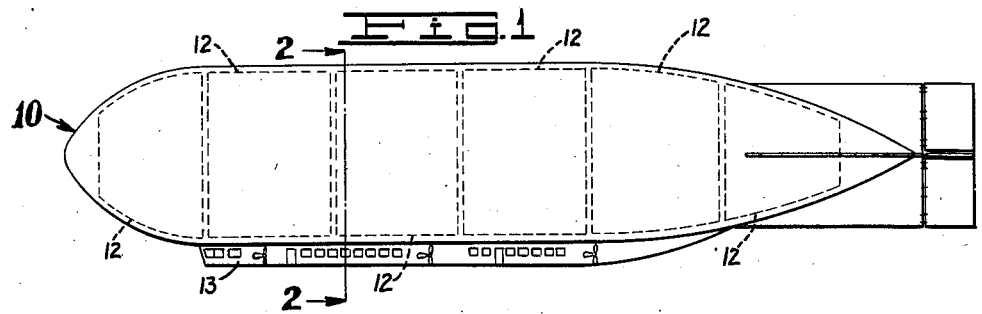
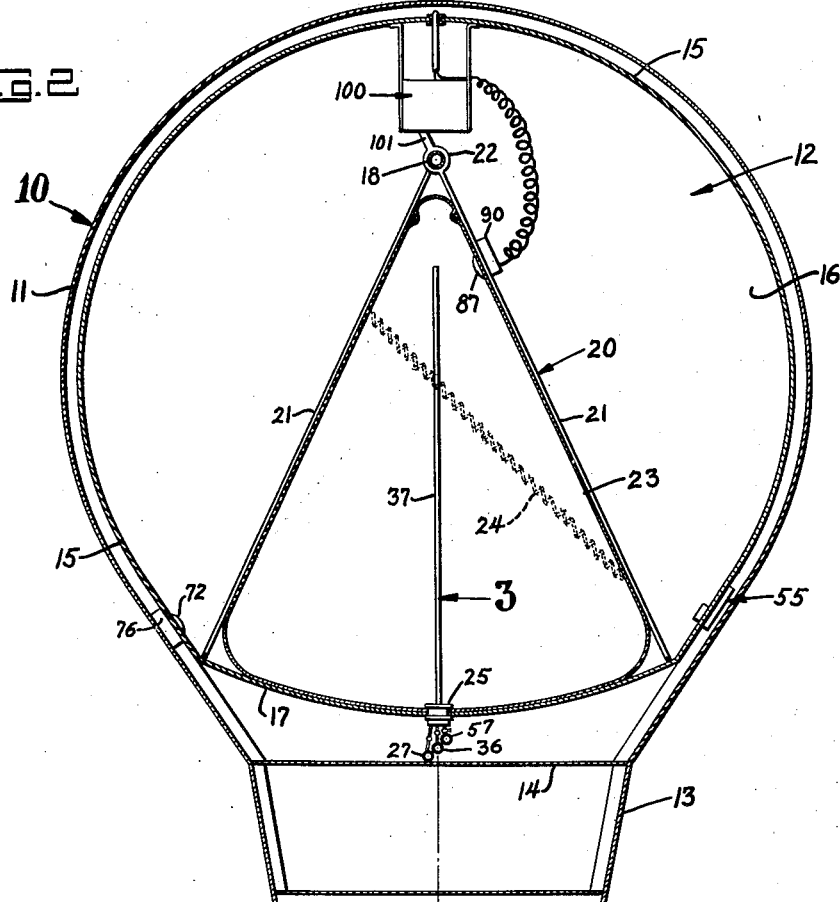
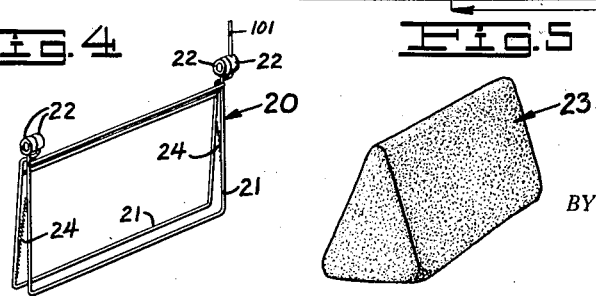
INVENTOR.
C. S. HALL
BY
ATTORNEY.

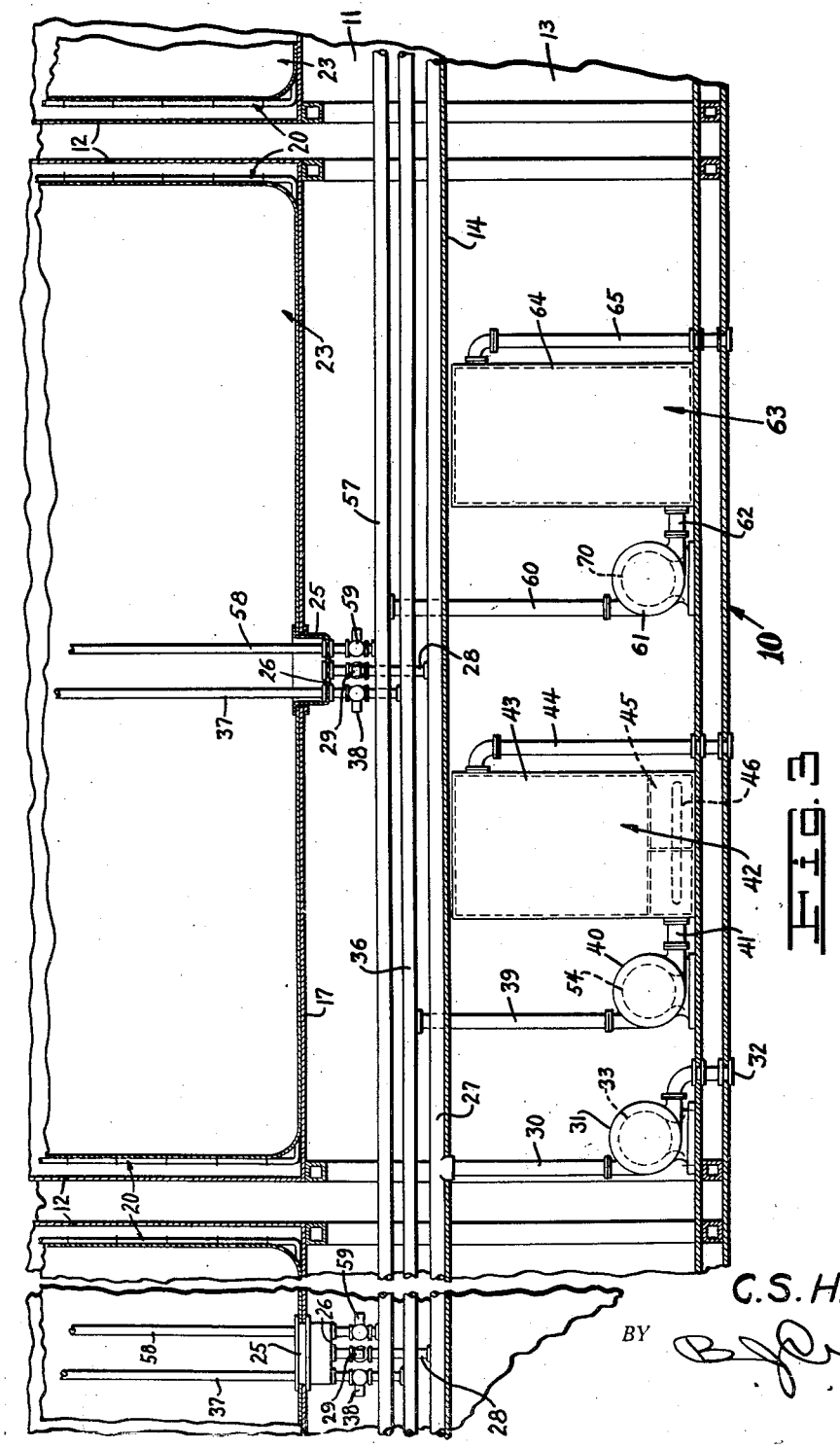

March 24, 1931.  C. S. HALL  1,797,502
AIRCRAFT
Filed May 22, 1929  3 Sheets-Sheet 3

INVENTOR.
C. S. HALL
BY
ATTORNEY.

Patented Mar. 24, 1931

1,797,502

UNITED STATES PATENT OFFICE

CHARLES S. HALL, OF LOS ANGELES, CALIFORNIA

AIRCRAFT

Application filed May 22, 1929. Serial No. 364,972.

This invention relates to improvements in lighter-than-air aircraft.

The general object of the invention is to provide an improved ballonette for lighter-than-air aircraft such as dirigibles.

Another object of the invention is to provide a ballonette having a collapsible air cell therein.

A further object of the invention is to provide novel means for controlling the passage of air to and from the air cell of a ballonette.

Another object of the invention is to provide means for heating and cooling the air delivered to the air cell of a ballonette.

Still another object of the invention is to provide means whereby the delivery of the air to the air cell and the heating and cooling of the air is automatically controlled.

A still further object of the invention is to provide means for indicating at a remote point the temperature, pressure and volume of the gases in the ballonette and the pressure and volume of the air in the air cell.

Other objects and the advantages of this invention will be apparent from the following description taken in connection with the accompanying drawings wherein:

Fig. 1 is a side elevation of a lighter-than-air aircraft or dirigible embodying the features of my invention.

Fig. 2 is an enlarged section taken on line 2—2 of Fig. 1.

Fig. 3 is a greatly enlarged section taken on line 3—3 of Fig. 2.

Fig. 4 is a perspective view of the air cell bag frame on a reduced scale.

Fig. 5 is a perspective view of the air cell bag on a reduced scale.

Figure 7:
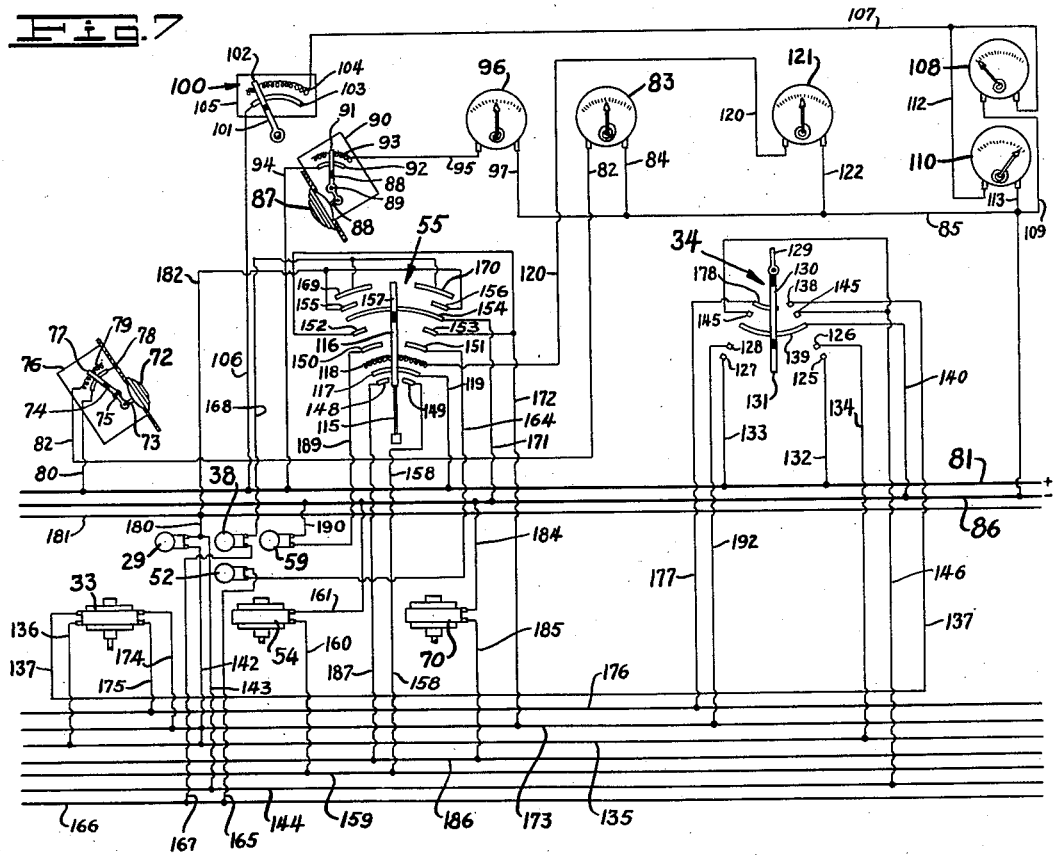
Fig. 7 is an electrical wiring diagram showing the various novel control features of my invention.

Referring to the drawings by reference characters I have shown my invention embodied in an aircraft indicated generally at 10. The aircraft shown is of the lighter-than-air type and is preferably of rigid or semi-rigid construction.

The aircraft comprises an outer envelope 11 having one or more gas holding compartments 12 therein. The aircraft further includes a cabin portion 13 separated from the ballonette compartment by a partition 14. As shown each of the gas containers 12 is of rigid construction and includes curved top and side walls 15, end walls 16 and an inverted arch-like bottom wall 17.

Secured to the end walls 16 and extending longitudinally in the container I provide a hollow shaft 18 of light weight which is adapted to support a frame indicated generally at 20 and shown in detail in Fig. 4. This frame comprises two sections 21 which are preferably made of light weight material and include bearing portions 22 for pivotally suspending it from the shaft 18.

Secured to the frame 20 I provide a gas tight fabric container or air cell 23 such as shown in detail in Fig. 5. The frame 20 and air cell 23 may be of any desired length and size and may extend the full length of the ballonette or may be shorter than the ballonette depending upon the requirements in each case.

For resiliently urging the frame sections 21 together to collapse the air cell 23 I provide coiled springs 24 which are secured to opposite end portions of the frame sections at each end as clearly shown in Figs. 2 and 4.

Secured to the bottom wall 17 of the container 12 and extending through the bottom wall of the air cell I provide a conduit 25 (see Fig. 3) having a closed bottom wall 26.

For conveying air at atmosphere temperature to the air cells 23 I provide a main pipe 27 from which laterals 28 extend to the conduits 25 of each of the air cells. Each of the laterals 28 are shown as adapted to extend through the bottom wall 26 of the conduit and the passageway through each of the laterals 28 is controlled by an electrically operated shut-off valve 29 which may be of any of the well known electro-magnetic type.

Air is forced into the main pipe 27 through the pipe 30 by a reversible pump 31 which draws the air from the exterior of the aircraft through an inlet pipe 32. The pump 31 is shown as adapted to be driven by an electric motor 33 which is preferably of the reversible type so that air may be either forced into the main pipe 27 or drawn therefrom and exhausted into the atmosphere.

As shown the actuation of the motor 33 is controlled by a switch indicated generally at 34 in Fig. 7, which is preferably located in the control cabin of the aircraft (remote from the ballonette) and will be more fully described hereinafter.

For conveying heated air to the air cells I provide a main pipe line 36 from which laterals 37 extend to the conduits 25 of each of the air cells. Each of the laterals 37 are shown as extending through the bottom wall 26 of the conduits to a point adjacent the top of the air cells and the passageway through each of the laterals 37 is controlled by an electrically operated shut off valve 38 similar to the valve 29. Air is forced into the main pipe 36 through a pipe 39 from a pump 40 which draws the air through a pipe 41 from a heater indicated at 42.

Figure 6:
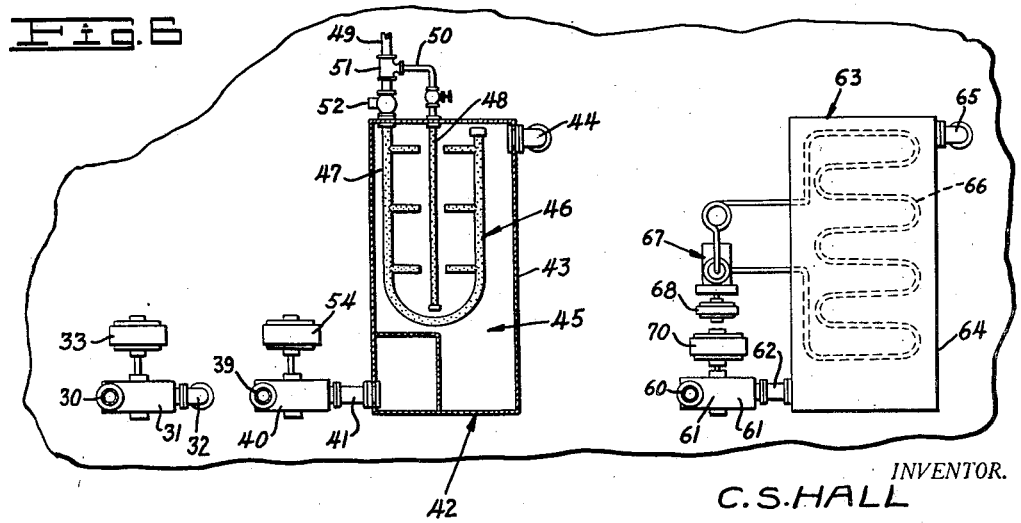
Fig. 6 is a top plan view of the heater, cooler and pumps with various parts shown in section.

The heater 42 includes a casing 43 having an air inlet pipe 44 from the exterior of the aircraft and a partitioned compartment 45 in which is positioned a heating element 46. As clearly shown in Fig. 6 the heating element is adapted to burn a gaseous fuel and includes a main burner 47 and a pilot burner 48. Fuel is supplied to the main burner through a pipe 49 from any suitable source of supply and the pilot burner is connected with the supply pipe 49 by a pipe 50 and a T fitting 51. For controlling the supply of fuel to the main burner 47 I provide an electrically operated shut-off valve 52.

The pump 40 is adapted to be operated by an electric motor 54 and the actuation of the motor is controlled by thermostatic switches 55 located on each of the ballonettes 12 which will be more fully explained hereinafter.

For conveying cooled air to the air cells 23 I provide a main pipe 57 from which laterals 58 extend to the conduits 25 of each of the air cells. Each of the laterals 58 extends through the bottom wall 26 of the conduits to a point adjacent the top of the air cells and the passageway through each of the laterals 58 is controlled by an electrically operated shut off valve 59. Air is forced into the main pipe 57 through a pipe 60 from a pump 61 which draws the air through a pipe 62 from a cooler indicated at 63. This cooler includes a casing 64 having an air inlet pipe 65 from the exterior of the aircraft and a cooling coil 66 therein. The cooling coil 66 is adapted to be supplied with a cooling fluid from a refrigerating device indicated generally at 67 which is shown as adapted to be driven by an electric motor 68.

The pump 61 is adapted to be operated by a motor 70 and the actuation of the motor 70 is controlled by the thermostatic switches 55 as will be more fully described hereinafter.

For indicating the pressure of the gases in the ballonette I provide on each of the ballonettes a pressure actuated diaphragm 72. As shown in Fig. 7 this diaphragm is arranged partly within the ballonette and includes an operating rod 73. The rod 73 is pivotally connected to an operating member 74 which is pivoted intermediate its length as at 75 to a plate 76. The operating member 74 is provided with a contact bar 77 which is adapted to make an electrical contact between a contact track 78 and a rheostat coil 79. The contact track 78 is connected by a wire 80 to a main positive feed wire 81 and one end of the rheostat coil is connected by a wire 82 to one terminal of an indicating member 83 which is preferably located in the remote control cabin of the aircraft. The other terminal of the indicator 83 is connected by a wire 84 to a wire 85 which is connected to a main negative feed wire 86.

For indicating the pressure of the air in the air cells 23 I provide on each of the air cells a pressure actuated diaphragm 87. As shown in Fig. 7 this diaphragm is arranged partly within the air cell and includes an operating rod 88. The rod 88 is pivotally connected to an operating member 89 which is pivoted intermediate its length to a plate 90. The operating member 89 includes a contact bar 91 which is adapted to make an electrical contact between a contact track 92 and a rheostat coil 93. The contact track 92 is connected by a wire 94 to the main positive feed wire 81 and one end of the rheostat is connected by a wire 95 to one terminal of an indicating member 96 which is preferably located in the control cabin of the aircraft. The other terminal of the indicator is connected by a wire 97 to the wire 85.

As the volume of gas in the ballonette varies the volume of air in the air cell varies inversely. I prefer to provide means to indicate both the volume of the gas in the ballonette and the air in the air cells so that if one means fails the other will function. To do this I provide in each of the ballonettes a device indicated generally at 100. As shown this device includes an arm 101 secured to one of the bearings 22 of the air cell frame 20. The arm 101 includes a contact bar 102 which is adapted to make an electrical contact between a contact track 103 and a rheostat coil 104 which is mounted in a housing 105. The contact track 103 is connected by a wire 106 to the main positive feed wire 81 and one end of the rheostat coil is connected by a wire 107 to one terminal of an indicator 108 which is adapted to show the volume of the air in the air cell. The other terminal of the indicator 108 is connected by a wire 109 to the wire 85.

The device for indicating the volume of the gas in the ballonette includes an indicator 110, one terminal of which is connected by a wire 112 to the wire 107 and the other terminal is connected by a wire 113 to the wire 85. Both the indicators 108 and 110 are preferably located in the control cabin of the aircraft similar to the indicators 83 and 96.

Each of the switches 55 includes an arm 115 which is made of a thermoresponsive metal anchored at one end and having a contact bar 116 mounted thereon adjacent the other end. The contact bar 116 is adapted to make an electrical contact between a contact track 117 and a rheostat coil 118. The contact track 117 is connected by a wire 119 to the main positive feed wire 81 and one end of the rheostat coil is connected by a wire 120 to one terminal of an indicating member 121 which is preferably located in the control cabin of the aircraft and is adapted to show the temperature of the gas in the ballonete. The other terminal of the indicator is connected by a wire 122 to the wire 85.

The switch 34 which controls the operation of the motor 33 includes a set of contacts 125 and 126, a set of contacts 127 and 128 and a pivoted operating arm 129. The operating arm 129 includes a contact portion 130 and a contact portion 131 insulated from the portion 130. The contact 125 is connected to the main positive feed wire 81 by a wire 132 and the contact 127 is connected by a wire 133 to the main positive feed wire 81.

The contact 126 is connected by a wire 134 to feed wire 135. One side of one field of the motor 33 is connected by a wire 136 to the feed wire 135 and the opposite side of the field is connected by a wire 137 to a contact 138 of the switch 34. Thus it will be seen that when the operating arm 129 is moved to a position wherein the contact portion 131 bridges the contacts 125 and 126 the current will flow from the main positive feed wire 81 through wire 132 to the contact 125 thence through the contact portion 131 of the arm 129 to the contact 126. From the contact 126 the current flows through the wire 134 to the feed wire 135, thence through the wire 136 to the motor 33. The current returns from the motor 33 through the wire 137 to the contact 138 and thence through the contact 130 of the arm 129 to a contact track 139 of the switch 34 from which it passes through a wire 140 to the main negative feed wire 86, thus operating the motor 33 in a direction to actuate the pump 31 in a direction to force air into the feed pipe 27.

One terminal of each of the electric air control valves 29 is connected by a wire 142 to the feed wire 135 and the other terminal of the valves is connected by a wire 143 to a feed wire 144 and a set of contacts 145 of the switch 34 are connected by a wire 146 to the feed wire 144. Thus when the switch arm 129 is in a position as just previously described to cause the motor 33 to actuate the pump 31 to force air into the main pipe 27 the contact portion 130 of the switch arm bridges the contact 145 and the contact track 139. The current then passes from the feed wire 135 through the wire 142 to one terminal of the air valve 29 thence from the other terminal through the wire 143 to the feed wire 144. From the wire 144 the current passes through the wire 146 to one of the contacts 145 thence through the contact portion 130 of the switch arm 129 to the contact track 139 and thence through the wire 140 to the main negative feed wire 86. Thus when the motor 33 and pump 31 are actuated to force air into the feed pipe 27 all the valves 29 are opened and remain open so long as the switch 34 is in a position to operate the motor 33. When the switch 34 is moved to a neutral position as shown in Fig. 7 to discontinue the operation of the motor 33 the supply of current to the valves 29 is shut off and the valves are actuated to control passage through the lateral pipes 28.

Each of the thermostatic switches 55 further includes a set of opposed contacts 148 and 149, a set of opposed contacts 150 and 151, a set of opposed contacts 152 and 153, a contact track 154 and a set of opposed contacts 155 and 156 and a contact portion 157 movable with and insulated from the contact bar 116.

The contact 149 is connected by a wire 158 to a feed wire 159 and a wire 160 connects the feed wire 159 and one terminal of the motor 54, the other terminal of which is connected by a wire 161 to the main negative feed wire 86.

Thus when the gases in the ballonette cool the thermo-responsive arm 115 moves the contact bar to a position where it bridges the contact track 117 and the contact 149 whereupon the electric current flows from the main positive feed wire 81 through the wire 119 to the contact track 117, thence through the contact track 117 to the contact 149 from which it flows through the wire 158 to the feed wire 159 thence through the wire 160 to the motor and thence from the motor through the wire 161 to the main negative feed wire 86 thus operating the motor to actuate the pump 54 to force heated air into the feed pipe 36.

At the same time the contact bar engages the contact 149 it engages the contacts 151 and 153. The contact 151 is connected by a wire 164 to one terminal of the fuel regulating valve 52, the other terminal of which is connected by a wire 165 to a feed wire 166 to which one terminal of each of the valves 38 is connected by a wire 167. The other terminal of each of the valves 38 is connected by a wire 168 to contacts 169 and 170 of the associated switch 55.

Thus the electric current flows from the main positive feed wire 81 through the wire 119 to the contact track 177, through the contact bar 116 to the contact 151 thence through the wire 164 to one terminal of the fuel control valve 52 and then from the other terminal through the wire 165 to the feed wire 166. From the feed wire the current flows through the wire 167 to the control valve 38 and thence through the wire 168 to the contact 170, through the contact bar 157 to the contact track 154 and then through a wire 171 to the main negative feed wire 86. Thus actuating the fuel valve 52 and the control valve 38 to an open position.

At the same time the contact bar 116 engages the contact 153, thus allowing the electric current to flow from the main positive feed wire 81 through wire 119 to the contact track 117 thence through the contact bar 116 to the contact 153 from which it passes through a wire 172 to a feed wire 173. One terminal of one field of the motor 33 is connected by a wire 174 to the feed wire 173 and the other terminal is connected by a wire 175 to a feed wire 176. The feed wire 176 is connected by a wire 177 to a contact 178 of the switch 34. Thus the electric current flows from the main positive feed wire 81 through the wire 119 to the contact track 117 thence through the contact bar 116 to the contact 153 from which it passes through the wire 172 to the feed wire 173, thence through the wire 174 to one terminal of the motor 33 and from the motor it passes through the wire 175 to the feed wire 176, through wire 177 to the contact 178 then through the contact bar 130 to the contact track 139 thence through the wire 140 to the main negative feed wire 86 thus operating the motor 33 to actuate the pump 31 to draw the air outward.

When the motor 33 is thus actuated the electric current flows from the feed wire 173 through the wire 142 to one terminal of the air valve 29 from the other terminal of which it flows through a wire 180 to a feed wire 181 which is connected by a wire 182 to the contacts 155 and 156 of the switches 55. From the contact 156 the current flows through the contact bar 157 to the contact track 154 thence through the wire 171 to the main negative feed wire 86 thus operating the air valve 29 to an open position.

From the foregoing description it will be apparent that when the thermo-responsive arm 115 responds to a drop in temperature in the ballonette and moves the contact bar 116 into engagement with the contacts 156 and 170 the motor 54 will operate the pump 40 to force air into the main feed pipe 36 and at the same time open the fuel control valve 52 to allow more heat to be produced in the heater 45 and furthermore at the same time open the control valve 38 of the ballonette with which the actuated switch 55 is associated to allow the heated air to enter the air cell. At the same time the heated air is being forced into the air cell the air valve 29 is opened and the motor 33 is actuated to operate the pump 31 to draw air out of the air cell into which the heated air is being forced. By making the contacts 153 and 156 and their corresponding contacts 152 and 155 on the opposite side of the switch so that the contact bars 116 and 157 will not engage them so long as they engage the contacts 149, 151, 170 and their corresponding contacts 148, 150 and 169 on the opposite side of the switch the air valve 29 will be closed and the motor 33 cut off before the valves 38 and 52 are closed and the motor 40 shut off thus allowing new air to be forced into the air cell after the old air has been drawn out.

One terminal of the motor 70 which actuates the pump 61 is connected by a wire 184 to the main negative feed wire 86 and the other terminal is connected by a wire 185 to a feed wire 186 and the feed wire 186 is connected to the contacts 148 of each of the switches by a wire 187. Thus when the thermo-responsive arm 115 responds to the raised temperature in the ballonette and moves the contact bar 116 into engagement with the contacts 148, 150 and 152 and the contact bar 157 into engagement with the contacts 155 and 169 the electric current will flow from the main positive feed wire 81 through the wire 119 to the contact track 117, through the contact bar 116 to the contact 148 thence through the wire 187 to the feed wire 186 from which it passes through the wire 185 to one terminal of the motor 70 and from the other terminal through wire 185 to the main negative feed wire 86, thus operating the motor 70 to actuate the pump 61 to force cooled air into the main feed pipe 57.

At the same time the motor 70 is thus actuated the electric current also flows from the contact bar 116 to the contact 150, through a wire 189 to one terminal of the control valve 59 and thence from the other terminal through a wire 190 to the main negative feed wire 86 thus actuating the valve 59 to an open position.

At the same time the valve 59 is opened and the motor 70 is actuated to operate the pump 61 to force cooled air into the air cell the air valve 29 is opened and the motor 33 is actuated to operate the pump 31 to draw air out of the air cell as previously described.

The switch 34 may also be moved to a position to cause the air valve 29 to be opened and to actuate the motor 33 to operate the pump 31 to draw air outward. To accomplish this the contact 128 of the switch 34 is connected by a wire 192 to the feed wire 173. Thus when the switch arm 129 is moved so that the contact bar 131 engages the contacts 127 and 128 the electric current will flow from the main positive feed wire 81 through the wire 133 to the contact 127 through the contact bar 131 to the contact 128, thence through the wire 192 to the feed wire 173, through the wire 174 to one terminal of the motor 33 from the other terminal of which it passes through wire 175 to the feed wire 176 thence through the wire 177 to the contact 178 from which it passes through the contact bar 130 to the contact track 139 thence through wire 140 to the main negative feed wire 86 thus operating the motor 33 to actuate the pump 31 to draw air outward. At the same time the motor 33 is thus operated the electric current flows from the main negative feed wire 86 through the wire 140 to the contact track 139, through the contact bar 130 to the contact 145 thence through the wire 146 to the feed wire 144 from which it passes through the wire 143 to one terminal of the air valve 29. From the other terminal of which it passes through the wire 142 to the feed wire 173 which is the positive wire to the motor, thus actuating the air valve 29 to an open position.

Having thus described my invention, I claim:

1. In an aircraft including a gas holding compartment, a collapsible air cell associated with said compartment, means to indicate the temperature of gas in said compartment, means to indicate the temperature in said cell, means to indicate the volume of said compartment and means to vary the temperature of air in said cell.

2. In an aircraft including a gas holding compartment, a collapsible air cell in said compartment, means to force heated air into said air cell, said means being automatically actuated when the temperature of said gas holding compartment falls below a predetermined point, means to force cooled air into said air cell, said means being automatically actuated when the temperature in said gas holding compartment rises above a predetermined point.

3. An aircraft having a gas holding compartment therein, an air cell associated with said compartment, heating means associated with said cell, cooling means associated with said cell, temperature responsive means associated with said air cell, means operated by said last mentioned means for operating the heating means when the temperature reaches a certain point and other means for operating the cooling means when the temperature reaches another certain point.

4. In an aircraft including a gas holding compartment, a collapsible air cell associated with said compartment, a refrigeration device, means to operate said device, said device including a housing, a cooling coil in said housing, means to convey air from the exterior of said aircraft into said housing, a pump, means to operate said pump, means to convey air from said housing to said pump and means to convey air from said pump to said air cell.

5. In an aircraft including a gas holding compartment, a collapsible air cell associated with said compartment, a heating member, said heating member including a housing, a heat producing element in said housing, means to convey air from the exterior of said aircraft into said housing, a pump, means to operate said pump, means to convey air from said heating member to said pump, means to convey air from said pump to said air cell and means whereby when said pump operating means is actuated the volume of heat produced by said heating element is increased.

6. In an aircraft including a gas holding compartment, a collapsible air cell associated with said compartment, means to heat the air in said air cell, said means being automatically actuated when the temperature of said gas holding compartment falls below a predetermined point, and means to cool the air in said air cell, said last mentioned means being automatically actuated when the temperature in said gas holding compartment rises above a predetermined point.

7. In an aircraft including a gas holding compartment, a collapsible air cell associated with said compartment, means to indicate the temperature of gas in said compartment, means to indicate the temperature of air in said cell and means to vary the temperature of air in said cell.

8. In an aircraft including a gas holding compartment, a collapsible air cell associated with said compartment, means to indicate the temperature of gas in said compartment, means to indicate the temperature of air in said cell and means to indicate the volume of said compartment.

In testimony whereof, I hereunto affix my signature.

CHARLES S. HALL.